3,070,594
AMINO ALKYL ETHERS OF STARCH
George C. Harris and Richard A. Leonard, Wilmington, Del., assignors to Hercules Powder Company, Wilmington, Del., a corporation of Delaware
No Drawing. Filed May 21, 1962, Ser. No. 196,452
7 Claims. (Cl. 260—233.3)

The present invention relates to cationic-nonionic derivatives of starch.

The term "cationic" is used herein to mean that the starch compounds include a tertiary amino group. While both the preparation of the cationic portion and the preparation of the nonionic portion of the starch compounds of this invention involve etherification reactions, for simplicity we will refer herein to the former as aminoalkylation and to the latter as hydroxyalkylation.

We have found that these new and useful products of starch, i.e. cationic-nonionic derivatives of starch, can be made by carrying out of the process which comprises reacting starch, in the presence of water and alkali, with an alkylene oxide and an aminoalkylation agent containing a tertiary amino group. Typical examples of these cationic-nonionic derivatives of starch are cationic-hydroxyalkyl derivatives of starch having the formula:

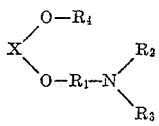

wherein X is starch, $R_1$ is selected from the group consisting of alkylene and hydroxyalkylene, $R_2$ and $R_3$ are each selected from the group consisting of alkyl, aryl, aralkyl, cycloalkyl and hydrogen, and $R_4$ is hydroxyalkyl. Of course, the $R_4$ group may stem from the same glucose unit as the

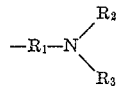

radical as shown in the above formula, or the $R_4$ group may stem from a different glucose unit than do the $R_2$ and $R_3$ groups.

Cationic-hydroxyalkyl derivatives of starch represented by the above formula may be prepared by aminoalkylation of starches including raw starch, dextrinized starch, hydrolyzed starch, oxidized starch and the like, with an aminoalkylation agent comprising dialkylaminoalkyl epoxides, dialkylaminoalkyl halides, and the corresponding compounds containing aryl groups in addition to the alkyl groups.

Representative examples of suitable aminoalkylation agents which may be used herein include β-dimethylaminoethyl chloride; β-diethylaminoethyl chloride; β-dimethylaminoisopropyl chloride; 3-dibutylamino - 1,2-epoxypropane; 2-bromo-5-diethylaminopentane hydrobromide; morpholinoethyl chloride; N-(2,3-epoxypropyl) piperidine; and N,N-(2,3-epoxypropyl) methyl aniline. The various halides (e.g., chloro-, bromo- and so on) can be used interchangeably. Instead of the free amines (e.g., β-diethylaminoethyl chloride), the hydrochloride or other salts of these reagents may also be used. It will also be evident that besides the alkyl, aryl and aralkyl types, aminoalkylation agents containing cyclic groups may also be used.

Typical examples of specific starch derivatives in accordance with this invention include diethylaminoethyl hydroxypropyl starch, diethylaminoethyl hydroxyethyl starch, dimethylaminoethyl hydroxypropyl starch, diethylaminopropyl hydroxypropyl starch, morpholinoethyl hydroxypropyl starch.

The starch derivatives of this invention are prepared in an alkaline medium. Preparation is preferably accomplished by suspending the starch in water containing, or to which is later added, a sufficient amount of an alkaline material to maintain the reaction mixture in an alkaline state during the reaction. The starch derivatives of this invention are then prepared with the required amount of aminoalkylation agent and hydroxyalkylation agent to give the degree of substitution (D.S.) desired. When the aminoalkylation and hydroxyalkylation reactions are completed, the pH of the reaction mixture is adjusted to about 3–6, e.g. with mineral acid, and the resulting product recovered by any one of a number of known means.

It is well known that starch, which in its natural state is in the form of discrete granules, will in the presence of water and sufficient alkali, undergo gelatinization. The phenomenon of gelatinization involves the swelling, rupture and disintegration of the starch granule, so that it will disperse in water to form a homogeneous hydrated colloidal dispersion, whereas ungelatinized starch granules, on the other hand, will settle out of water suspension and may be filtered and dried, still retaining their original granule form.

In preparing various derivatives of starch, including starch ethers, it is well known in this art what conditions to use in order to rupture the starch granule and also in order to maintain the starch granule. In the former case the derivatives are referred to as gelatinized derivatives, and in the latter case the derivatives are referred to as granular or ungelatinized derivatives. The three main conditions which have an important effect on whether the derivatives are gelatinized or granular are etherification temperature, amount of alkali used as etherification catalyst, and the presence or absence of a gelatinization inhibitor. The art knows that the higher the temperature and the larger the amount and the more concentrated the alkali used during the etherification, the greater the tendency of the starch to gelatinize. Also the art knows several gelatinization inhibitors, including e.g. alkali metal salts and alkaline earth metal salts. Although the alkali and alkaline earth metal chlorides, carbonates, acetates, nitrates and sulfates are operable, perhaps sodium sulfate and sodium chloride are the two most widely used gelatinization inhibitors.

Our invention is applicable to both gelatinized and granular cationic-nonionic derivatives of starch.

The etherification temperature and the relative order of the aminoalkylation reaction and the hydroxyalkylation reaction for preparing the gelatinized cationic-nonionic derivatives of starch are described in the two immediately following paragraphs.

According to one embodiment of the present invention, the aminoalkylation is carried out at a temperature of about 60° C.–65° C. and then the hydroxyalkylation agent is added to the reaction mixture and the hydroxyalkylation reaction carried out at a temperature of at least about 70° C. According to a second embodiment of this invention, the hydroxyalkylation is conducted at a temperature of at least about 70° C. and then the aminoalkylation agent is added to the reaction mixture and the aminoalkylation reaction conducted at a temperature of at least about 50° C., preferably 60° C.–65° C., or the aminoalkylation temperature may remain at the same temperature used for the hydroxyalkylation reaction. According to a third embodiment of this invention, the aminoalkylation reaction is carried out at about room temperature and then the hydroxyalkylation agent is added to the reaction mixture and the hydroxyalkylation reaction is carried out at a temperature of at least about 70° C. In a fourth embodiment of this invention, both the aminoalkylation agent and the hydroxyalkylation agent are added at the same time and the aminoalkylation reaction and the hydroxyalkylation reaction are carried out simultaneously at a temperature of at least about 70° C.

As would be expected, at the lower temperatures longer time is required to obtain a given D.S., and conversely. As to maximum temperature, since the reaction is faster and, therefore, more practical, preferably the aminoalkylation temperature will be at least about 50° C. and more preferably about 60° C.–65° C. While higher temperatures than 65° C. for aminoalkylation and 70° C. for hydroxyalkylation may be used, so long as one does not decompose the reactants or starch derviative products, usually there is no advantage in using such higher temperatures. As to minimum temperatures, when aminoalkylating before hydroxyalkylating, room temperature or even lower temperatures can be used but they are less practical. When aminoalkylating after hydroxyalkylating, temperatures below about 50° C. are impractical because hydroxyalkylation gives a gelatinous product. When aminoalkylating and hydroxyalkylating simultaneously, the minimum aminoalkylation temperature is obviously fixed by the minimum hydroxyalkylation temperature of about 70° C.

The granular cationic-nonionic starch ether products of the present invention may be prepared according to any of the four embodiments disclosed herein for preparing the gelatinized products, e.g. using a temperature (aminoalkylation temperature and hydroxyalkylation temperature) of 0° C.–50° C., preferably about 30° C., without a gelatinization inhibitor. With the use of a gelatinization inhibitor, this temperature may be increased to about 70° C. Of course where the aminoalkylation and the hydroxyalkylation reactions are carried out separately, the temperatures need not be the same for the two reactions.

The term "granular" is used herein to designate the physical state or property of the cationic-nonionic starch ether products described and claimed herein. That is, the term granular is used to mean that the starch granule is substantially maintained, in other words that the starch is not gelatinized to any appreciable degree, during the preparation of said cationic-nonionic starch ether products of the present invention. Conversely, the term "gelatinized" is used herein to designate the physical state or property of the cationic-nonionic starch ether products described and claimed herein. That is, the term gelatinized is used to mean that the starch granule is substantially ruptured, in other words that the starch is gelatinized to an appreciable degree, during the preparation of said cationic-nonionic starch ether products of the present invention.

The term "alkylene oxide" is used herein to include epoxides or substituted epoxides (e.g. propylene oxide, ethylene oxide, or epoxyalkyl sulfonates such as sodium 2,3-epoxypropane sulfonate); halohydrins or substituted halohydrins (e.g. ethylene chlorohydrin, propylene chlorohydrin, sodium 2-hydroxy-3-chloropropane sulfonate).

As will be readily apparent to those skilled in the starch art, various alkaline materials are suitable for the aminoalkylation and hydroxyalkylation reactions of this invention. We prefer to use strongly alkaline hydroxides, e.g. the alkali metal hydroxides such as sodium or potassium; the quaternary ammonium hydroxides, e.g. trimethylbenzyl ammonium hydroxide, dimethyldibenzyl ammonium hydroxide; and others. The alkali is believed to serve the three functions of (1) swelling and dispersing the starch, thus activating it, (2) participating in the aminoalkylation reaction, and (3) catalyzing the hydroxyalkylation reaction.

The amount of aminoalkylation reagent and hydroxyalkylation reagent will vary depending on the particular reagents chosen and the D.S. desired, and the D.S. desired in turn will depend on the particular use for which the starch derivatives of this invention are intended. One outstanding use of the starch derivatives of this invention is in an aqueous emulsion along with a higher organic ketene dimer, the emulsion being used as a paper size and the product of the present invention serving to aid in preparing the emulsion and also in retaining the ketene dimer on the fiber. D.S. is the average number of hydroxylic hydrogens per anhydroglucose unit (i.e. the starch molecule repeating unit), replaced by the aminoalkylation reagent substituent and the hydroxyalkylation reagent substituent. There are three hydroxylic hydrogens per anhydroglucose unit, therefore the greatest total D.S. possible is three. For this paper size use, the aminoalkylation D.S. of the starch molecule repeating unit of the starch derivative products of the present invention must be at least 0.005 and the hydroxyalkyl D.S. must be at least 0.01; the remaining hydroxylic hydrogens (2.985) may be unsubstituted or they may be substituted with additional aminoalkylation reagent or additional hydroxyalkylation reagent or both. The preferred aminoalkylation D.S. range is about 0.01–0.03 and the preferred hydroxyalkylation D.S. range is about 0.01–0.10. The foregoing is given merely to show one use of the starch derivatives of the present invention and is not intended to limit the invention.

The starch derivative of this invention have many uses, including emulsification and retention aid in sizing paper (Examples 13 and 14 hereinafter), adhesives, thickening agent, and others.

The starches which we may start with in this invention may be derived from any sources including corn, wheat, tapioca, potato, waxy maize, sago or rice.

The following Examples 1–12 hereinafter illustrate specific embodiments of this invention. Examples 13 and 14 hereinafter illustrate the use of the products of this invention as an emulsifier and retention aid in the sizing of paper. In giving the properties of the products of the examples, in each example the first D.S. given is the aminoalkylation D.S. and the second D.S. given is the hydroxyalkylation D.S. In the examples agitation was continued throughout the preparation of the aqueous alkaline starch suspensions and the reaction periods.

EXAMPLE 1

This example illustrates aminoalkylating at 60° C.–65° C. followed by hydroxyalkylating at 70° C–75° C.

100 grams of spray dried wheat starch, 400 grams of water and 2 grams of NaOH in 10 grams of water were agitated to prepare an aqueous alkaline starch suspension. To this suspension was added 2 grams of diethylaminoethyl chloride hydrochloride in 20 grams of water. The temperature of the suspension was brought to 60° C.–65° C. and maintained for 2 hours. Then 1 gram of propylene oxide in 10 grams of water was added to the resulting reaction mixture and the temperature increased to 70° C.–75° C. and maintained for 4 hours. The final reaction mixture was adjusted to a pH of 5–6 with mineral acid and roll dried to obtain a gelatinized product having the following properties:

| | | |
|---|---|---|
| Percent Nitrogen | 0.22 | D.S. 0.03 |
| Zeisel-Morgan Value, percent | 0.95 | D.S. 0.02 |

EXAMPLE 2

This example was carried out in exactly the same way as Example 1, except ethylene oxide was used instead of propylene oxide. The gelatinized product had the following properties:

| | | |
|---|---|---|
| Percent Nitrogen | 0.22 | D.S. 0.03 |
| Zeisel-Morgan Value, percent | 1.27 | D.S. 0.03 |

EXAMPLE 3

This example was carried out in exactly the same way as Example 1 except 5 grams of propylene oxide in 50 grams of water was used as the hydroxyalkylation agent. The gelatinized product had the following properties:

| | | |
|---|---|---|
| Percent Nitrogen | 0.13 | D.S. 0.01 |
| Zeisel-Morgan Value, percent | 2.21 | D.S. 0.05 |

EXAMPLE 4

This example was carried out in exactly the same way as Example 1 except 10 grams of propylene oxide in 100 grams of water was used as the hydroxyalkylation agent. The gelatinized product had the following properties:

| | | |
|---|---|---|
| Percent Nitrogen | 0.21 | D.S. 0.27 |
| Zeisel-Morgan Value, percent | 7.32 | D.S. 0.16 |

EXAMPLE 5

This example illustrates hydroxyalkylating at at least 70° C. followed by aminoalkylating at 70° C. One hundred grams of spray dried wheat starch, 400 grams of water and 2 grams of NaOH in 10 grams of water were agitated to prepare an aqueous alkaline starch suspension. To this suspension was added 5 grams of propylene oxide in 20 grams of water. The temperature of the suspension was brought to 70° C. and maintained for four hours, then 4 grams of diethylaminoethyl chloride hydrochloride in 20 grams of water was added to the resulting reaction mixture and the temperature maintained at 70° C. for an additional 2 hours. The final reaction mixture was adjusted to a pH of 5-6 with mineral acid and roll dried to obtain a gelatinized product having the following properties:

| | | |
|---|---|---|
| Percent Nitrogen | 0.37 | D.S. 0.04 |
| Zeisel-Morgan Value, percent | 4.25 | D.S. 0.09 |

EXAMPLE 6

This example illustrates simultaneously aminoalkylating and hydroxyalkylating at 70° C.–75° C.

100 grams of spray dried wheat starch, 400 grams of water and 2 grams of sodium hydroxide in 10 grams of water were agitated to prepare an aqueous alkaline starch suspension. To this suspension was added 4 grams of diethylaminoethyl chloride hydrochloride in 10 grams of water and 3 grams of propylene oxide in 10 grams of water. The temperature of the suspension was brought to 70° C.–75° C. and maintained for 4 hours. The resulting reaction mixture was adjusted to a pH of 5-6 with mineral acid and roll dried to obtain a gelatinized product having the following properties:

| | | |
|---|---|---|
| Percent Nitrogen | 0.37 | D.S. 0.04 |
| Zeisel-Morgan Value, percent | 1.66 | D.S. 0.04 |

EXAMPLE 7

This example illustrates aminoalkylating at room temperature followed by hydroxyalkylating at 70° C.–75° C.

100 grams of spray dried wheat starch, 400 grams of water and 2 grams of NaOH in 10 grams of water were agitated to prepare an aqueous alkaline starch suspension. To this suspension was added 4 grams of diethylaminoethyl chloride hydrochloride in 20 grams of water and the reaction was allowed to continue overnight. Then 3 grams of propylene oxide in 10 grams of water was added to the resulting mixture and the temperature increased to 70° C.–75° C. and maintained for 4 hours. The final reaction mixture was adjusted to a pH of 5-6 with mineral acid and roll dried to obtain a gelatinized product having the following properties:

| | | |
|---|---|---|
| Percent Nitrogen | 0.27 | D.S. 0.03 |
| Zeisel-Morgan Value, percent | 1.66 | D.S. 0.03 |

EXAMPLE 8

This example illustrates simultaneously aminoalkylating and hydroxyalkylating at 30° C. without the use of a gelatinization inhibitor.

450 grams of spray dried wheat starch was suspended in a solution of 40 grams sodium chloride, 16 grams diethylaminoethyl chloride hydrochloride and 12 grams propylene oxide in 450 grams of water. To this suspension was added a solution of 12 grams sodium hydroxide in 100 grams of water. The temperature of the suspension was brought to 30° C. and maintained for 16 hours. The resulting reaction mixture was adjusted to a pH of 3.0–3.5 with mineral acid, filtered, washed with water and spray dried to obtain a granular product having the following properties:

| | | |
|---|---|---|
| Percent Nitrogen | 0.25 | D.S. 0.03 |
| Zeisel-Morgan Value, percent | 0.60 | D.S. 0.01 |

EXAMPLE 9

The conditions used for this example were substantially the same as those used for Example 8 above except that the simultaneous aminoalkylation hydroxyalkylation of the starch was carried out at room temperature for 24 hours, and also except that the starch was hydroxyalkylated to a D.S. of 0.04. A granular product was obtained having the following properties:

| | | |
|---|---|---|
| Percent Nitrogen | 0.27 | D.S. 0.03 |
| Zeisel-Morgan Value, percent | 1.78 | D.S. 0.04 |

EXAMPLE 10

This example illustrates simultaneously aminoalkylating and hydroxyalkylating at 70° C. for 3 hours in the presence of sodium sulfate as the gelatinization inhibitor.

450 grams of spray dried wheat starch was suspended in 450 grams of water and to this suspension were added 120 grams sodium sulfate and 16 grams of diethylaminoethyl chloride hydrochloride. To the resulting suspension was added a solution of 12 grams sodium hydroxide and 12 grams sodium sulfate in 150 grams of water. To this final suspension was added 16 grams of propylene oxide and the temperature of the suspension was brought to 70° C. and maintained for three hours. The resulting reaction mixture was adjusted to a pH of 3.0–3.5 with mineral acid, filtered, washed with water and spray dried to obtain a granular product having the following properties:

| | | |
|---|---|---|
| Percent Nitrogen | 0.27 | D.S. 0.03 |
| Zeisel-Morgan Value, percent | 1.88 | D.S. 0.04 |

EXAMPLE 11

This example illustrates aminoalkylating and then hydroxyalkylating at 30° C. without the use of a gelatinization inhibitor.

450 grams of spray dried wheat starch was suspended in a solution of 16 grams diethylaminoethyl chloride hydrochloride in 450 grams of water. To this suspension was added a solution of 12 grams sodium hydroxide in 100 grams of water. The temperature of the suspension was brought to 30° C. and maintained for 1 hour. Then 12 grams of propylene oxide was added to the resulting reaction mixture and the temperature maintained at 30° C. for an additional 15 hours. The final reaction mixture was adjusted to a pH of 3.0–3.5 with mineral acid, filtered, washed with water and spray dried to obtain a granular product having the following properties:

| | | |
|---|---|---|
| Percent Nitrogen | 0.24 | D.S. 0.03 |
| Zeisel-Morgan Value, percent | 0.59 | D.S. 0.01 |

EXAMPLE 12

This example illustrates hydroxyalkylating and then aminoalkylating at 70° C. in the presence of sodium sulfate as the gelatinization inhibitor.

450 grams of spray dried wheat starch was suspended in 450 grams of water and to this suspension was added 120 grams sodium sulfate. To the resulting suspension was added a solution of 12 grams sodium hydroxide and 12 grams sodium sulfate in 150 grams of water. To this final suspension was added 16 grams of propylene oxide and the temperature of the suspension was brought to 70° C. and maintained for 2 hours. Then 16 grams of diethylaminoethyl chloride hydrochloride was added to the resulting reaction mixture and the temperature maintained at 70° C. for 1 additional hour. The final reaction mixture was adjusted to a pH of 3.0–3.5 with mineral acid, filtered, washed with water and spray dried to obtain a granular product having the following properties:

| | | |
|---|---|---|
| Percent Nitrogen | 0.29 | D.S. 0.03 |
| Zeisel-Morgan Value, percent | 1.90 | D.S. 0.04 |

EXAMPLES 13 AND 14

These examples illustrate using the products of the present invention as an emulsification and retention aid in sizing paper.

Three grams of each of the starch products of Examples 2 and 8 above were cooked at 90° C.–95° C. for 15 minutes in 100 ml. of water. The cooked starch, in each case, was diluted to 100 grams by addition of water, cooled to 60° C.–65° C. and 1.5 grams of a mixed tetradecyl-hexadecyl ketene dimer prepared from a mixture of palmitic and stearic acids added to make a crude dispersion. This crude dispersion was further dispersed by passing it three times through a preheated hand homogenizer. A 5 gram sample of the resulting emulsion was diluted to 750 ml. with water to give a 0.01% concentration of ketene dimer therein. After cooling to room temperature this emulsion was used to size paper by adding the emulsion to an aqueous suspension of wood pulp and making into paper handsheets by conventional procedure. The emulsion addition was adjusted to add 0.1% ketene dimer based on dry weight of fiber. Table 1 below gives the sizing results obtained.

Table 1

| Starch Derivatives Used | Photometer Sizing | |
|---|---|---|
| | Percent Reflectance | Secs. to reach said percent Reflectance |
| From Example 2 | 91.4 | 600 |
| From Example 8 | 85 | 548 |

As is known in the art, photometer sizing or standard feather ink resistance is the time in seconds required for the reflectance of the lower side of the sized sheet of paper to be lowered to 85% of its original reflectance value; and if the sheet is well enough sized so that a longer time than 600 seconds would be required to reach 85% of its original reflectance value, then it is the usual practice to measure the percent reflectance at 600 seconds.

The present application is a continuation-in-part of our copending application Serial No. 838,073, filed September 4, 1959, and entitled Starch Derivatives, now abandoned.

As many apparent and widely different embodiments of the present invention may be made without departing from the spirit and scope thereof, it is to be understood that the invention is not limited to the specific embodiments thereof except as defined in the appended claims.

What we claim and desire to protect by Letters Patent is:

1. A cationic-nonionic product of starch having the following structural formula:

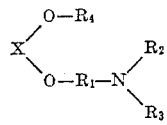

wherein X is starch, $R_1$ is selected from the group consisting of alkylene and hydroxyalkylene, $R_2$ and $R_3$ are each selected from the group consisting of alkyl, aryl, aralkyl, cycloalkyl and hydrogen, and $R_4$ is hydroxyalkyl.

2. A cold water dispersible cationic-nonionic product of starch having the following structural formula:

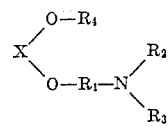

wherein X is starch, $R_1$ is selected from the group consisting of alkylene and hydroxyalkylene, $R_2$ and $R_3$ are each selected from the group consisting of alkyl, aryl, aralkyl, cycloalkyl and hydrogen, and $R_4$ is hydroxyalkyl.

3. Dialkylaminoalkyl hydroxyalkyl starch.
4. Dialkylaminoalkyl hydroxypropyl starch.
5. Dimethylaminoethyl hydroxypropyl starch.
6. Diethylaminoethyl hydroxyethyl starch.
7. Diethylaminoethyl hydroxypropyl starch.

References Cited in the file of this patent

UNITED STATES PATENTS

| | | |
|---|---|---|
| 2,744,894 | Benedict et al. | May 8, 1956 |
| 2,813,093 | Caldwell et al. | Nov. 12, 1957 |
| 2,845,417 | Kesler et al. | July 29, 1958 |
| 2,853,484 | Lolkema | Sept. 23, 1958 |
| 2,876,217 | Paschall | Mar. 3, 1959 |
| 2,917,506 | Caldwell et al. | Dec. 15, 1959 |